Sept. 14, 1965  SHIGEO MAMIYA ETAL  3,205,710

VACUUM INDICATOR

Filed Dec. 14, 1961

INVENTOR.
SHIGEO MAMIYA ET AL
TAKESHI ODASHIMA
BY
Attorney

United States Patent Office 3,205,710
Patented Sept. 14, 1965

3,205,710
VACUUM INDICATOR
Shigeo Mamiya and Takeshi Odashima, Tokyo, Japan, assignors to Saginomiya Seisakusho Co., Ltd., Tokyo Japan
Filed Dec. 14, 1961, Ser. No. 159,251
4 Claims. (Cl. 73—410)

This invention relates to a vacuum indicator for measuring the degree of vacuum in instruments like a vacuum cleaner.

The main object of the invention is to provide the vacuum indicator which indicates correctly the degree of vacuum by changing the slight change of the degree of vacuum into the large rotative movement of a pointer.

Another object of the invention is to provide the vacuum indicator wherein the neutral position of a pointer is regulated easily by a pivot according to the degree of vacuum.

Still another object of the invention is to provide a vacuum indicator wherein a pointer is supported by a knife edge to decrease the error produced by friction.

Other and further objects of the invention will be readily apparent when the following description is considered with the accompanying drawings wherein.

Figure 1:
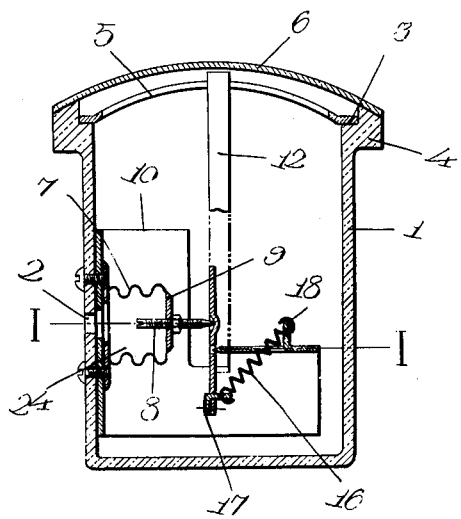
FIG. 1 is a vertical sectional view of the invention.

This vacuum indicator includes a cup-shaped case 1 having an inlet 2 in one side wall and a rim 4 forming a shoulder 3 to support a dial plate 5. This dial plate 5 has a graduated scale painted in red, blue or yellow colors on its front surface. A dished crystal 6 is superimposed over the dial plate 5, the margin of which is fixed to the rim 4 of case 1.

A bellows 7 having a pivot screw or rod 8 in its movable end plate 9 is fixed around the inlet 2 with a frame 10 for supporting a base plate 11 forming an integral part of a pointer 12. Pivot screw or rod 8 is shown in the form of a machine screw pointed at one end and having an adjusting slot at its other end. The screw engages a tapped hole in and centrally of bellow plate 9 and is releasably fixed in position of rotative adjustment by a lock nut threaded thereon. Longitudinal adjustment of the screw is effected by first loosening the lock nut, then inserting a screw driver through inlet opening 2 to engage and turn the screw.

Base plate 11 forming an integral part of the one-piece pointer element, has a small conical bearing 14 pressed from its central area, and two bearing grooves 13, one on each side of point bearing 14. Referring particularly to FIGS. 1 and 3, it is noted that a line connecting bearing grooves 13 passes a little below point bearing 14. From FIG. 2 it is seen that frame 10 comprises a single piece of sheet metal including a flat base bent at 90° to define a first projection. This projection is vertically slotted from its upper edge and again bent at 90° to define an edge parallel with and spaced from the base. A pair of spaced bearing points 15 are formed integrally with this edge and define a line or axis perpendicular to and offset from the axis of pivot rod or screw 8, normal to the plane of FIG. 1. Pointer 12 is likewise a one-piece unitary item formed from a metal stamping, as clearly shown upon FIG. 3.

A tension coil spring 16 has one end attached to a lug or projection 18 struck up from the material of frame 10, and its other end attached to pointer element 12 at a point below the aforesaid pivot axis. Thus the effect of the spring is to urge the pointer into counterclockwise rotation about its pivot axis, as viewed upon FIG. 1. The spring thus acts also to hold the pointer firmly in contact with the pointed bearing end of screw 8 and pivot bearing points 15. Thus the degree of magnification is essentially equal to the ratio of the radial distance of the indicating end of pointer 12 from a line connecting bearing grooves 13, the radial distance of point bearing 14 from said line.

Figure 4:
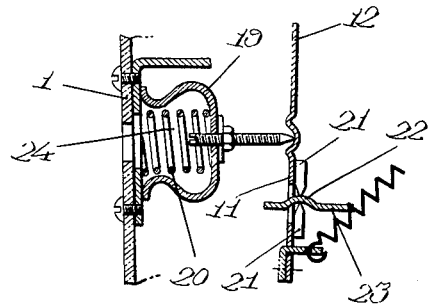
FIG. 4 is an enlarged modified form of the invention.

Another embodiment of the invention is shown in FIG. 4. In this embodiment a cup-shaped rubber member 19 forming a bellows, which has a spring 20 therein, is fixed to the case 1 to make a vacuum chamber instead of bellows 7 of the apparatus in FIG. 1.

Figure 2:
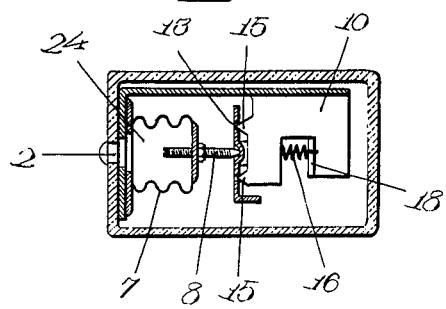
FIG. 2 is a section on line 1—1, FIG. 1.
Figure 3:
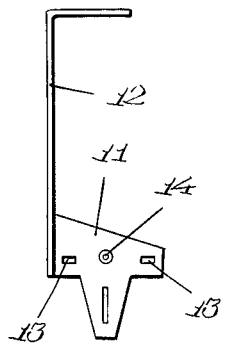
FIG. 3 is a front elevation of the pointer used in the instrument.

In place of bearing grooves 13 and bearing points 15 of FIGS. 1, 2 and 3 the base plate 11 of pointer 12 is supported by engaging knife edges 21 fixed on base plate 11 with a recess 22 of a projection 23 extending from frame 10.

In operation, when the vacuum chamber 24 of bellows 7 or cup-shaped rubber member 19 is connected to an instrument such as a vacuum cleaner, bellows 7 or rubber member 19 contracts and elongates with change in vacuum.

In the embodiment of FIG. 1, when the vacuum increases, the pivot screw or rod 8 being screwed in the movable end 9 of bellows 7 aided by the urge of spring 16, moves to the left as the parts are viewed upon FIG. 1, so that the pointer 12 pivots counterclockwise around the line determined by bearing points 15 by spring 16 to indicate the increase of the degree of vacuum.

With decreasing vacuum, bellows 7 expands and pivots pointer 12 in the clockwise direction.

In the embodiment shown in FIG. 4, as the base plate 11 forming an integral part of pointer 12, is supported firmly by knife edges 21 and the opposed surfaces of recess 22 of projection 23 which define spaced bearings, the pointer 12 responds in a like manner to the delicate movement of pivot screw or rod 8. Moreover, the movement of pivot screw or rod is very smooth, because the vacuum chamber 24 is composed of the cup-shaped rubber member 19 and is assisted in expansion under decreasing vacuum, by the tension of spring 20.

It will be understood that in the species of FIG. 1 the natural resiliency of bellows 7 urges it toward expansion and is sufficient to overcome the small force excited by light spring 16 upon pivot screw 8. Likewise in the species of FIG. 4, the combined resiliency of bellows 19 in tendency to expand under decreasing vacuum, is assisted by the thrust of spring 20, so that the force exerted by spring 16 is overcome. In other words, spring 16 exerts merely enough force to hold the bearing of pointer 12 in contact with the point of screw 8, at all times.

Thus, the invention has advantages in that the pointer 12 has a large movement with a slight change of the degree of vacuum in chamber 24 and also as the length of pivot 8 is adjusted suitably by its screw for suiting the degree of vacuum of instruments.

Although specific embodiments of the invention have been shown for purpose of illustration, it is to be understood that various changes and modification may be made therein as will be readily apparent to a person skilled in the art.

What is claimed is:
1. A vacuum gage comprising a casing having a wall and a first aperture therethrough, a bellows within said casing secured in pressure-tight relation with said aperture for expansion and contraction along a first axis, a bearing screw threaded through the expansion end of said bellows and extending along said first axis, said screw having a pointed end exteriorly of said bellows, a one-piece frame including a flat base fixed to said wall, a first planar projection extending from one edge of said base, normal thereto, and a second planar projection extending from one edge of said first projection normal to the planes of said base and first projection, one edge of said second projection having spaced bearing points defining a second axis normal to and offset from said first axis, a one-piece pointer having three bearing grooves engageable, respectively, with the pointed end of said bearing screw and said spaced bearing points and an indicator extending radially of said second axis, and a coil spring having its ends connected, respectively, with said frame and said pointer, and urging said pointer in rotation about said second axis to maintain the same in contact with all said bearing points, rotation of said bearing screw effecting zeroing adjustment of said indicator.

2. A vacuum gage comprising a casing, an expansion bellows fixed within said casing for expansion and contraction along a first axis, a pointed pivot rod secured with the expansion end of said bellows for translation in and along said first axis, a frame comprising a base fixed to said casing, a first extension projecting from said base in a first direction a second extension projecting from said first extension in a second direction normal to said first direction, a pair of bearing points integral with an edge of said second extension and defining a second axis normal to and offset from said first axis, a pointer element in said casing and having bearing grooves engaging the point of said rod and said pair of bearing points, and a single spring engaging and urging said pointer into rotation about said second axis to hold the bearing grooves thereof in contact with all said bearing points.

3. A device as in claim 2 wherein the pivot rod is secured to the bellows by screw threads and the pivot rod is provided with a slotted head, and aligned apertures in the casing, frame, and bellows whereby the slotted head is accessible through said apertures.

4. In a vacuum gage, a casing, a cup-shaped rubber member constituting an expansion bellows with a spring therein having a base secured to a wall of said casing, a pivot rod fixed with the expansion end of said bellows and disposed in the direction of expansion and contraction of said bellows to define a first axis, said pivot rod having a pointed end exteriorly of said bellows, a frame comprising a base fixed to said casing, a first projection extending from said base and lying in a plane normal thereto and parallel with said first axis, a second projection extending from one edge of said first projection normal to the planes of said base and first projection, said second projection having a pair of opposing bearing grooves defining a second axis normal to and offset from said first axis, a pointer element having a pair of spaced knife edges, each engageable, respectively, with one of said opposing bearing grooves to mount said element for pivoting about said second axis, and indicator unitary with said element and extending radially of said second axis, and a spring connected between said element and said frame and urging said element in rotation about said second axis into contact with the pointed end of said pivot rod.

References Cited by the Examiner
UNITED STATES PATENTS

| | | | |
|---|---|---|---|
| 1,641,387 | 9/27 | Ingram | 73—410 |
| 2,319,011 | 5/43 | Meredith | 73—408 X |
| 2,477,233 | 7/49 | Bristol | 73—393 |
| 2,740,941 | 4/56 | Kelley | 73—408 X |
| 2,850,900 | 9/58 | Billington | 73—406 |

RICHARD C. QUEISSER, *Primary Examiner.*

DAVID SCHONBERG, *Examiner.*